United States Patent [19]
Ishii et al.

[11] Patent Number: 5,977,985
[45] Date of Patent: Nov. 2, 1999

[54] OBJECT-BASED IMAGE PROCESSING SYSTEM AND METHOD

[75] Inventors: Yusuke Ishii, Cupertino; Jingxi Zhang, Foster City, both of Calif.

[73] Assignee: US JVC Corporation, Elmwood Park, N.J.

[21] Appl. No.: 08/699,739

[22] Filed: Aug. 20, 1996

[51] Int. Cl.$^6$ .................................................... G06F 15/00
[52] U.S. Cl. ........................................ 345/433; 345/118
[58] Field of Search .................................. 345/118, 433; 424/401

[56] References Cited

U.S. PATENT DOCUMENTS 5,262,856  11/1993  Lippman et al. ..................... 424/401
5,425,137   6/1995  Mohan et al. ......................... 345/433

OTHER PUBLICATIONS

J. Vitter, "US&R: A New Framework for Redoing", Brown University, Oct. 1984.

Primary Examiner—Mark K. Zimmerman
Assistant Examiner—Chante' Harrison
Attorney, Agent, or Firm—Fenwick & West LLP

[57] ABSTRACT

An improved object-based image processing system and method which minimizes and improves predictability and control over regeneration and recalculation time when the user makes changes to operations. Image clips containing bitmaps of object results are stored to minimize repeated application of operations. Partial updates for modified operations are facilitated so that unnecessary regeneration of the entire region of operation is avoided. Greater user control is achieved by permitting the user to designate a temporary background image.

23 Claims, 18 Drawing Sheets

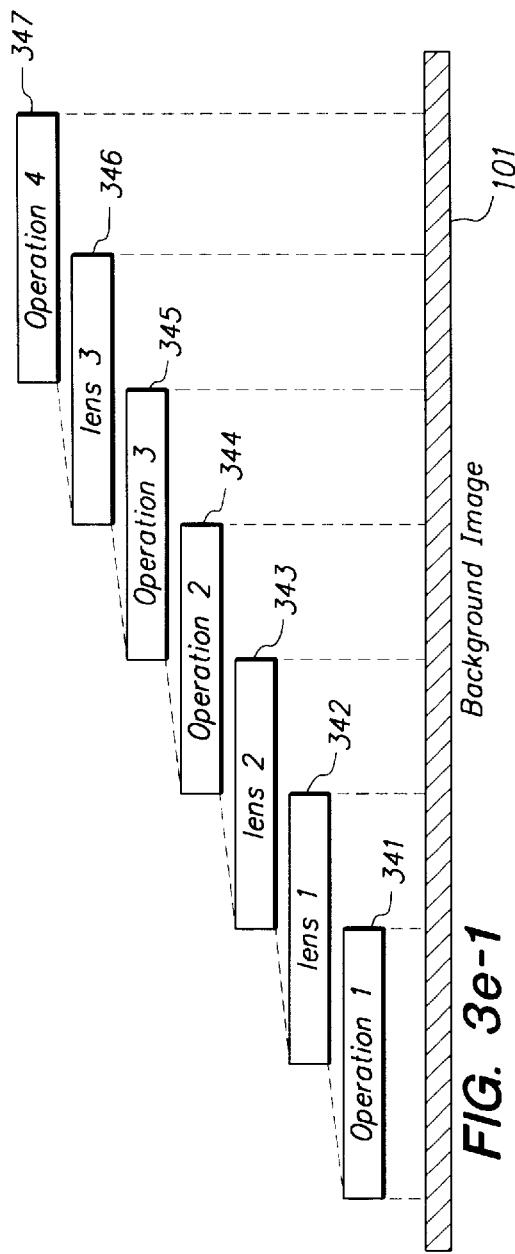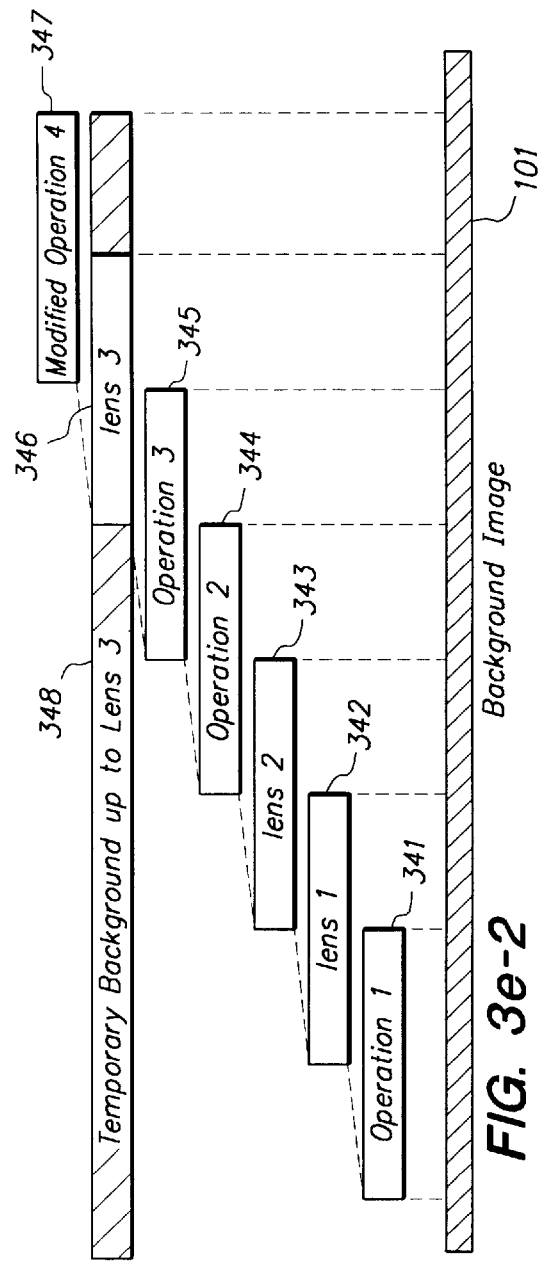

W: Object that has to be regenerated as a whole
P: Object that allows for partial update

OBJECT-BASED IMAGE PROCESSING SYSTEM AND METHOD

CROSS-REFERENCE TO RELATED U.S. PATENT

This application is related to U.S. Pat. No. 5,425,137 for "System and Method for Processing Images Using Computer-Implemented Software Objects Representing Lenses", by Sudhir Mohan, Yusuke Ishii, Saisatyanarayana R. Gadiraju, and Sudhir R. Parikh, issued Jun. 13, 1995, the disclosure of which is incorporated herein by reference.

BACKGROUND OF THE INVENTION

1. Field of the Invention

This invention relates to image processing technologies and, more particularly, to an improved image processing system and method employing user-configurable virtual objects representing lenses and image processing operations.

2. Description of the Related Art

Related U.S. Pat. No. 5,425,137 (the '137 patent) describes an object-based image processing system and method wherein operations to be performed on the background image are defined in terms of a plurality of virtual lens objects, or "lenses". Each lens object represents one or more operations that are defined by user-specified lens attributes. One such attribute specifies the region of operation of the lens object. Other lens attributes specify the type and magnitude of operations to be performed on the underlying image within the defined region of the lens object. These operations may simulate actual physical lens behavior (such as enlarging or distorting the image) or they may be more abstract (such as making a color image black-and-white).

The user may also specify operations that are not part of lens objects. Such operations are still movable and modifiable in a similar manner as lens objects. This type of representation may be preferable for some types of operations, such as paint strokes. In the present application, the term "objects" refers to both lens objects and independent operations.

The user may specify any number of operations for a given lens object. Furthermore, the user may specify any number of objects (lens objects and/or independent operations) to operate on a given image. The regions of operation may or may not overlap one another, according to the user's preference. Objects are applied to the image in a user-specified order, so that overlapping objects form a virtual stack. When regions overlap one another, the transformed image that results from application of the first (or lowest level) object becomes input for subsequent (higher level) objects. Thus, as in a stack of real, physical lenses, lens operations and independent operations are cumulative.

Each image processing operation is recorded as an object so that it may be individually selected, modified, transformed or deleted without altering the original image. This facilitates user experimentation with various image processing options and combinations.

When objects overlap one another, the results of the first object's operations are in turn used as a source image for the second, overlapping, object's operations. A chain of operations represented by successively overlapping objects is thus formed. Any change in one of the operations in the chain may require re-application of one or more of the overlapping operations in the chain. One advantage of the invention described in the '137 patent is that when an operation is modified, the user is not required to keep track of other operations that will be affected by the modification or to manually redo work that is affected by the modification. Rather, the system performs automatic updates of the affected regions, including redoing any operations of overlapping objects as required.

When a change is made to an operation for a particular region of the image, some or all of the other operations for that region may have to be re-applied using new source image data. In order to facilitate automatic re-application, the invention described in the '137 patent maintains an object-oriented database of user operations containing information describing the sequence of operations and the area of application for each operation. Thus, referring now to FIG. 1b, there is shown a conceptual representation of the operation of the system of the '137 patent. Operations 102–110, represented by the letters A through I, are shown operating on particular regions of background image 101. The system attempts to optimize the speed of updating when operations change by selectively re-applying operations only to areas affected by the change. Thus, in the example shown in FIG. 1b, if the user modifies operation D 105, rather than re-applying the entire sequence of operations A through I to update the image, the system determines the minimum area of the image requiring update, and only reapplies operations affecting that area. In the example of FIG. 1b, only operations A, C, D, G, and H fall into the area affected by operation D. Therefore, after the change in operation D, only operations A, C, D, G, and H need to be re-applied. By avoiding unnecessary re-application of operations B, E, F, and I, the system more efficiently generates the new image.

Although the above-described scheme provides enhanced efficiency in updating images when operations change, as the number of operations that are performed on the same region of the image increases, the time it takes to re-apply those operations and update the image increases. The updating time is somewhat unpredictable to the user because it is affected by the number of operations that have to be re-applied, as well as by the relative complexity of those operations. For example, referring now to FIG. 2a, there is shown a background image 101 with four regions 201–204. A modification to operation 205 in region 201 is relatively slow to update, because there are many operations 209 in region 201 that must be re-applied. By contrast, a modification to operation 206 in region 202, or to operation 208 in region 204, would be relatively quick to update, because in each of these regions there are only two, relatively simple operations 210 and 206, or 212 and 208, to be re-applied. However, a modification to operation 207 in region 203 would be relatively slow to update because operation 211 is relatively complex and therefore takes longer to re-apply than does operations 209, 210, or 212. Since the user may not be aware of the number or complexity of underlying operations when making a change, there is unpredictability in the update time that will result from the change.

Furthermore, operations are not always stacked neatly on top of one another. For example, referring now to FIG. 2b, there is shown a background image 101 with three overlapping lens objects 213, 214, 215 containing operations. Because of the configuration of the lens objects, an update to an operation in lens object 215 may require updating of lens object 214, which in turn requires updating of lens object 213. Thus, nearly the entire background image 101 needs to be regenerated even when the change to one of the lens objects may be relatively small. This can lead to long recalculation delays as well as unpredictability in the update time.

SUMMARY OF THE INVENTION

The present invention provides a number of improvements to an object-based image processing system and method. These improvements minimize regeneration and recalculation time when the user makes changes to operations, and improve the predictability of regeneration time and providing mechanisms by which the user may exercise control over the regeneration time.

In order to reduce regeneration time, the system and method of the present invention selectively stores an image clip containing a bitmap representing the result of a lens object or independent operation so that the bitmap need not always be regenerated when changes are made to other operations.

Furthermore, the present invention provides partial update capability to regenerate an operation for a partial area instead of the entire original region of interest. Though it may not be applicable to all types of operations, the partial update capability can serve to reduce regeneration time considerably.

Finally, the present invention provides a capability whereby the user can specify a temporary background to be stored as a bitmapped image. This provides the user with improved control over regeneration time by permitting him or her to "lock" into place those objects that are less likely to change than other objects.

BRIEF DESCRIPTION OF THE DRAWINGS

FIGS. 3e.1 and 3e.2 are block diagrams illustrating a technique of providing a temporary background to expedite regeneration of an image.

FIG. 3f.2 is a screen shot of a user interface according to the present invention, including an operation list window with activation of a movable shade to control creation of a temporary background.

DESCRIPTION OF THE PREFERRED EMBODIMENT

Figure 1A:
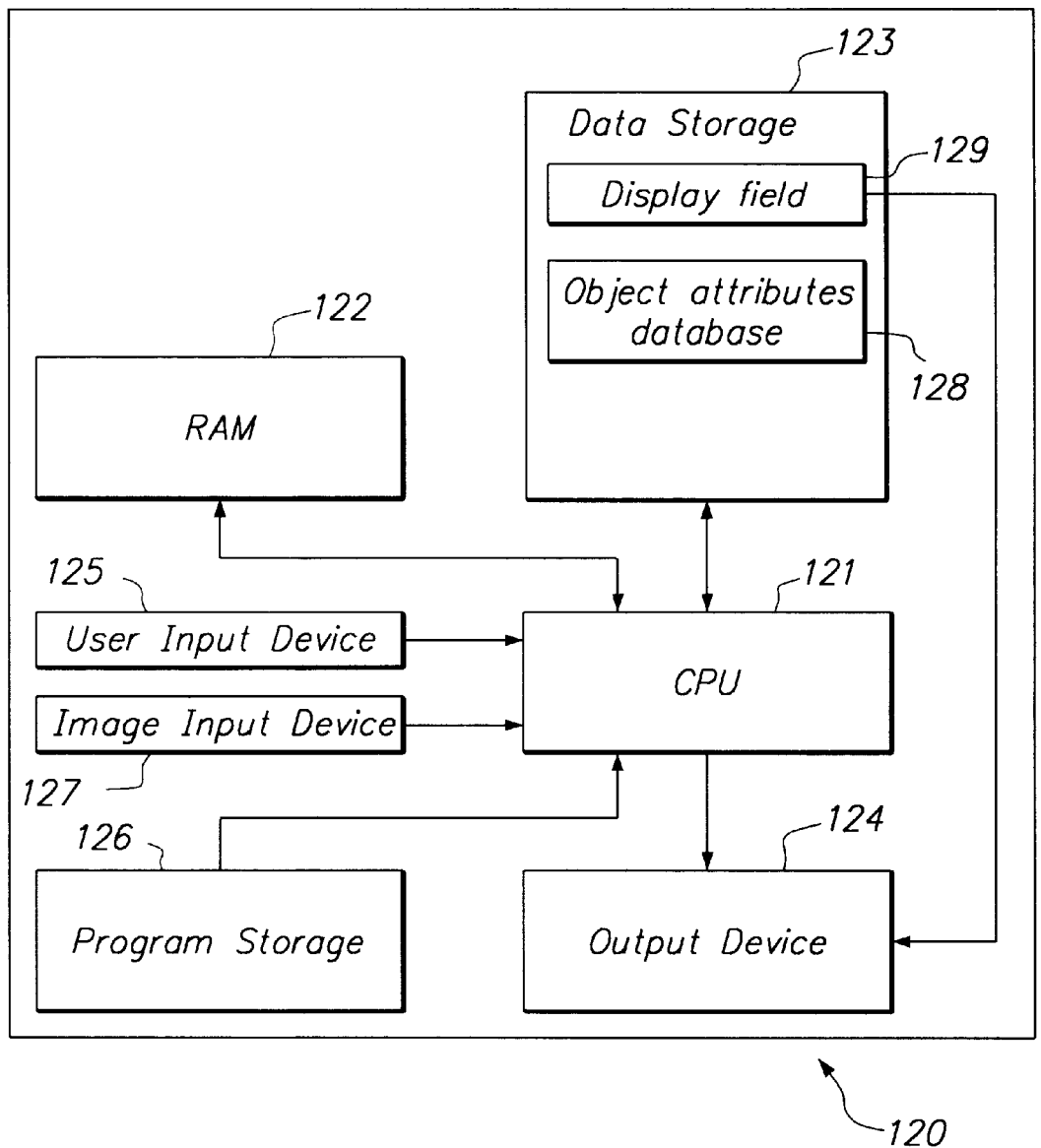
FIG. 1a is a block diagram of an implementation of the present invention.
Figure 1B:
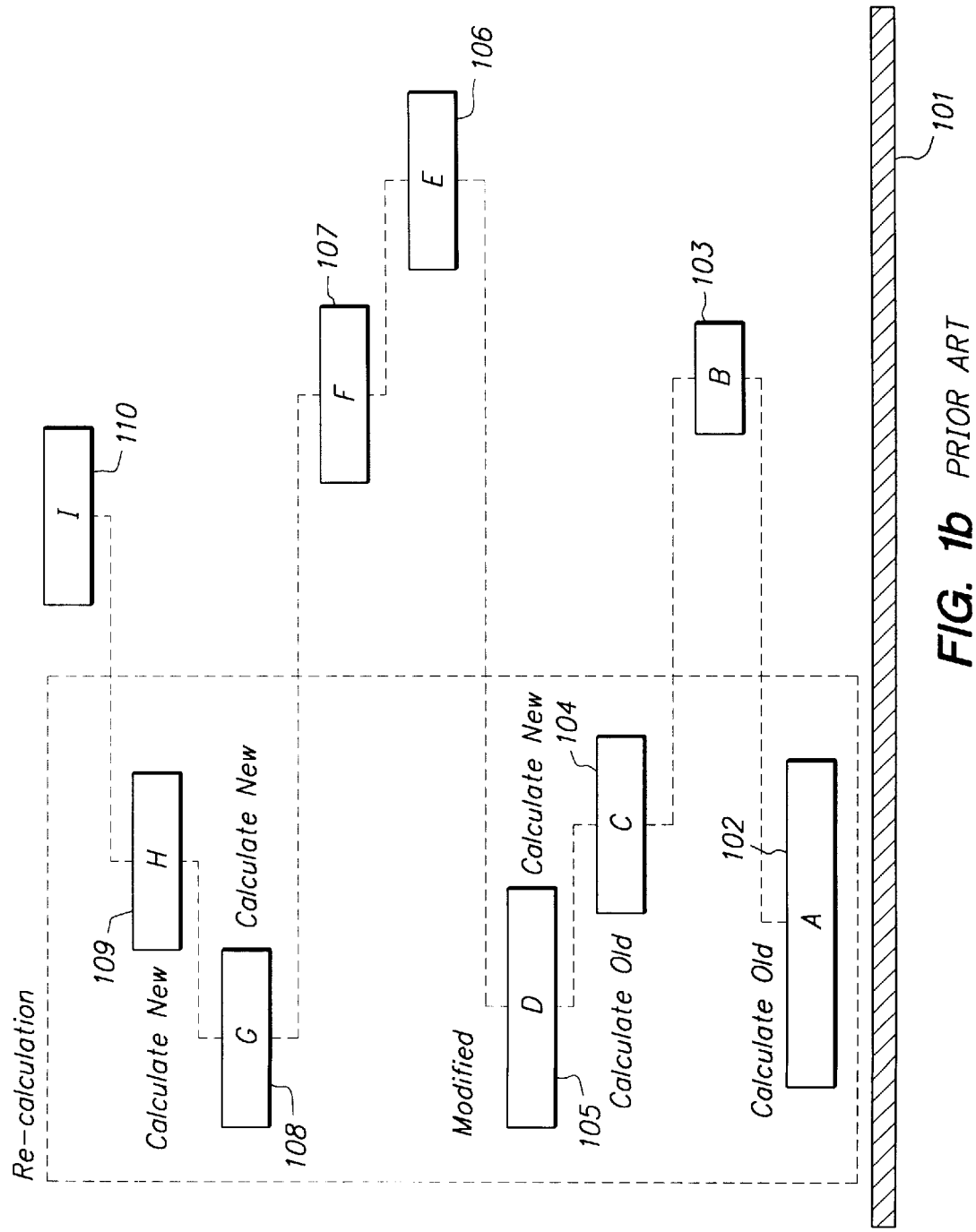
FIG. 1b is a block diagram showing several operations being performed in a conventional manner on a background image wherein a change is made to one of the operations, according to the prior art.

Referring now to FIG. 1a, there is shown a block diagram of the hardware elements of a typical implementation of image processing system 120 in accordance with the present invention. Background images may be supplied to system 120 using one or more image input devices 127 (such as a video camera, scanner, or the like), or may be read from data storage 123 (such as a disk). The user may supply commands to system 120 via one or more user input devices 125 (such as a keyboard and/or mouse). Central processing unit (CPU) 121 runs software program instructions, stored in program storage 126, which direct CPU 121 to perform the various functions of system 120. Data storage 123 may contain a representation of a display field 129, as well as a database 128 containing object attributes and other data.

The inventive aspects of the present invention lie primarily in the software instructions that control the hardware elements shown in FIG. 1a. In accordance with these software instructions, CPU 121 accepts user input from user input device 125, accepts image input from image input device 127, accesses data storage 123, and uses random access memory (RAM) 122 in a conventional manner as a workspace, to process images and generate output on output device 124. It has been found preferable to implement system 120 according to an object-oriented software environment such as the C++ programming language.

In the embodiment illustrated herein, CPU 120 can be a mainframe computer or a powerful personal computer or workstation; RAM 122 and data storage 123 are conventional RAM, read-only memory (ROM) and disk storage devices for the CPU; user input device 125 is a conventional keyboard and/or mouse; image input device 127 is a video camera with associated apparatus for converting a video image into a bitmap; and output device 124 conventionally displays or prints processed images, or sends processed images to processed image storage (not shown) for later viewing. In one embodiment, system 120 operates on a conventional Power Macintosh personal computer. The preferred embodiment operates on still images, but the techniques and concepts disclosed herein could be applied to moving images without departing from the spirit, or essential characteristics of the present invention.

The improvements described herein provide a mechanism for reducing image regeneration time and for improving user control over image regeneration by employing three techniques of image clips, and partial updates, and temporary backgrounds. Each of these techniques will be described in turn with reference to the accompanying figures. The described techniques may be used alone or in combination with one another without departing from the essential characteristics of the present invention.

Image Clips

Figure 3A:
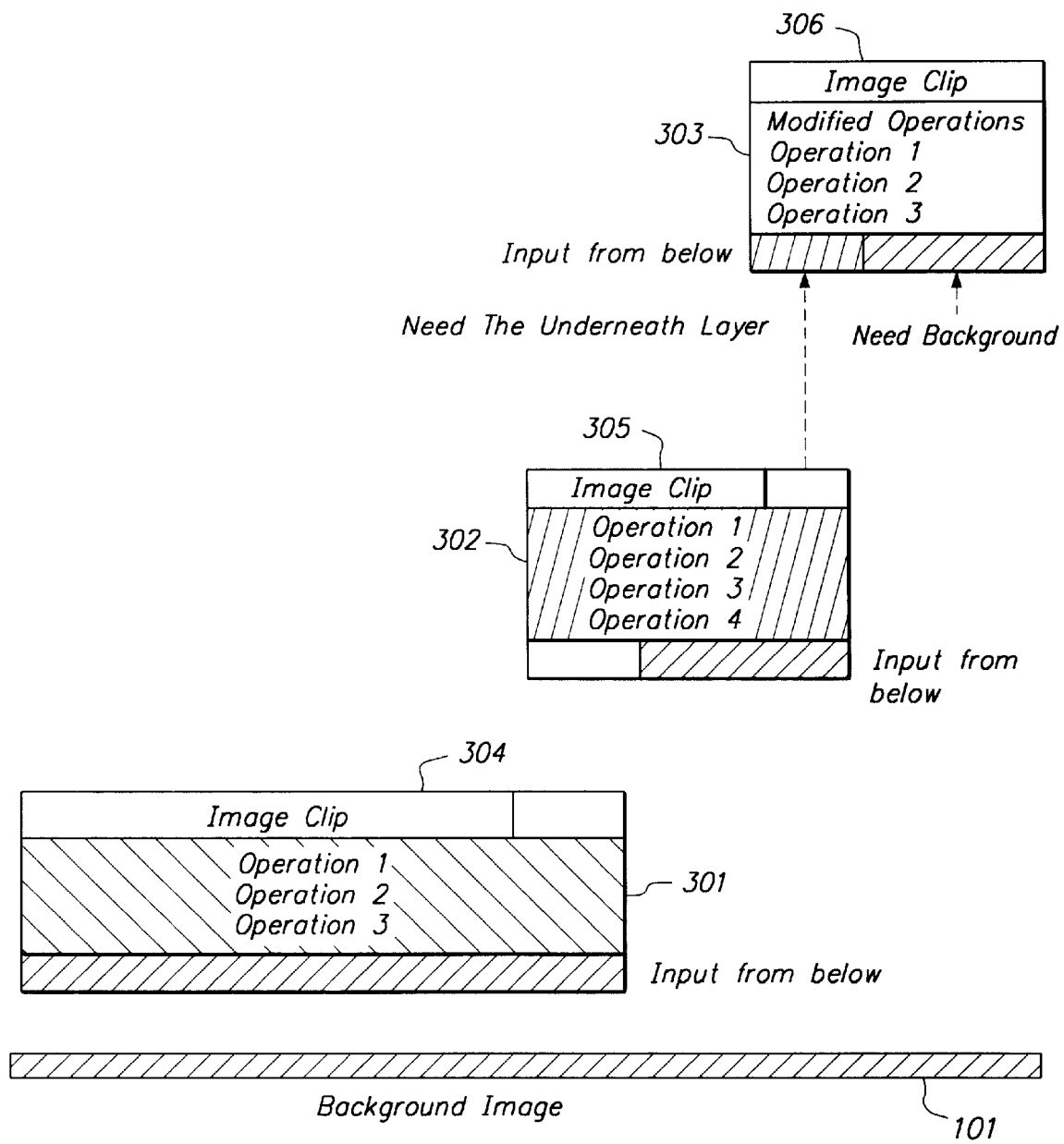
FIG. 3a is a block diagram showing lenses containing operations and storing image clips.

Referring now to FIG. 3a, it has been found advantageous for a lens object or independent operation to contain an image clip, or bitmap, of the visual result from the object. This technique can save regeneration time when the output from the object is needed for screen display or for input to another object. Rather than regenerating the visual result every time it is needed, the object can simply output the stored image clip. Thus, when an object 303 or its operations is modified, although the output of that object 303 and any overlaying objects may need to be regenerated, the output of underlying objects 301, 302 need not be regenerated since system 120 can simply use the previously-stored image clips 304, 305 instead.

Figure 2A:
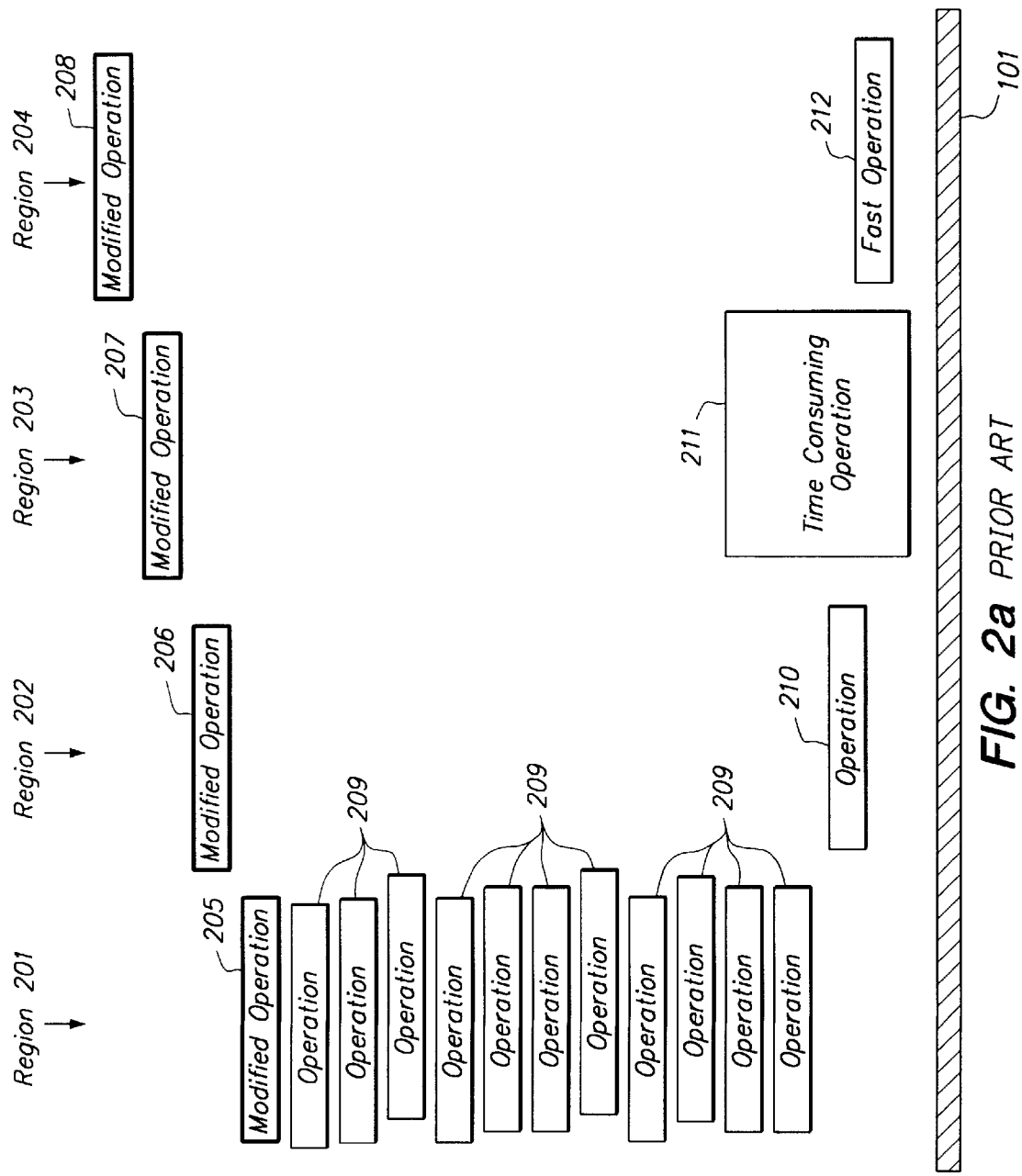
FIG. 2a is a block diagram showing several operations of varying complexity being performed on various regions of a background image, according to the prior art.
Figure 2B:
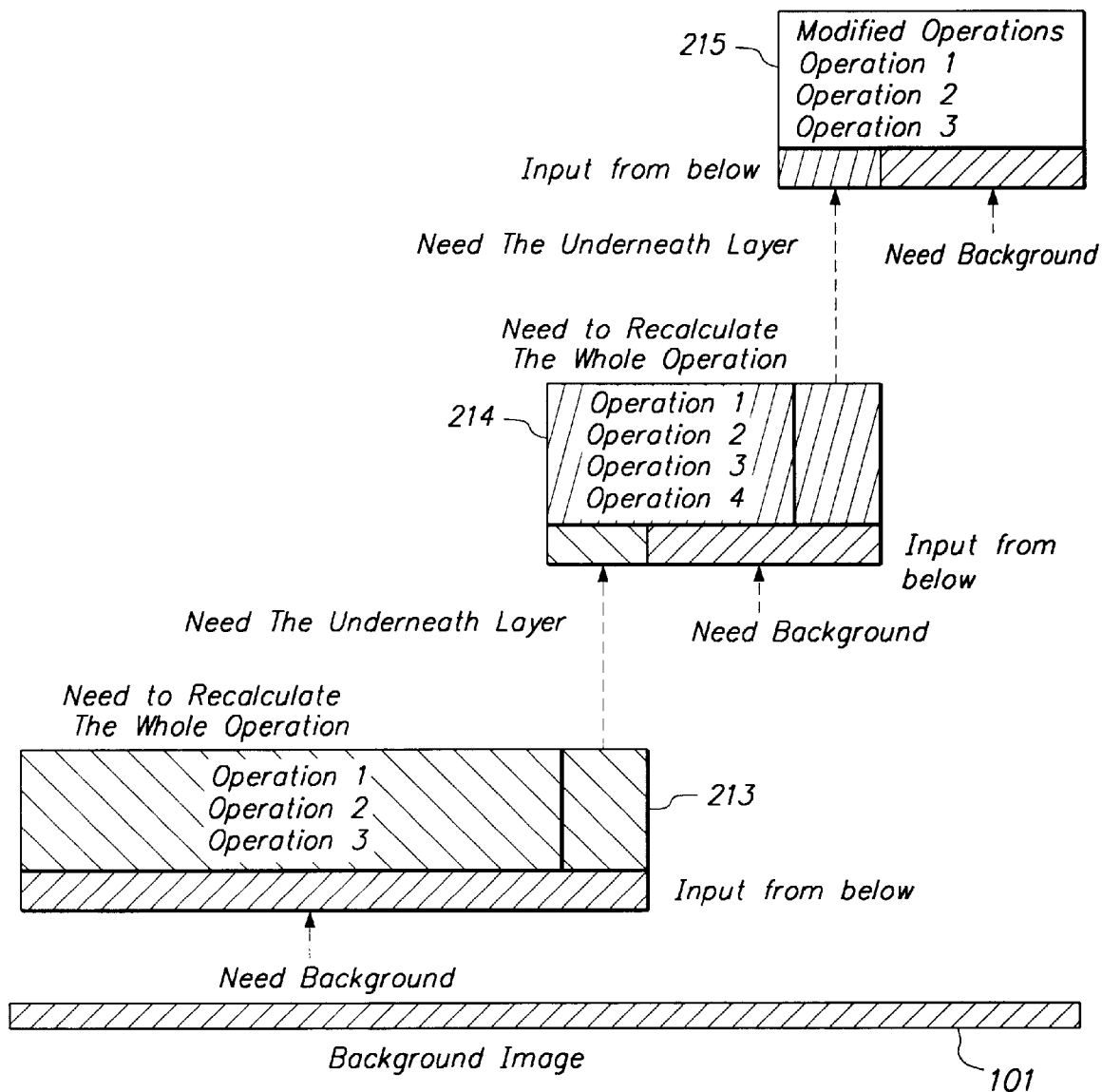
FIG. 2b is a block diagram showing several overlapping lenses containing operations being performed on a background image and requiring substantial regeneration after a small change, according to the prior art.

For example, in FIG. 3a there is shown a block diagram of a background image 101 with three overlapping lens objects 301, 302, 303 containing operations. The configuration of lens objects 301, 302, 303 is substantially similar to the configuration of lens objects 213, 214, 215 shown in FIG. 2b. As described previously in connection with FIG. 2b, an update to an operation in lens object 215 would typically require prior updating of lens object 214, which would in turn require prior updating of lens object 213, forcing regeneration of nearly the entire background image. However, in FIG. 3a, each of lens objects 301, 302, 303 contains an image clip 304, 305, 306 obviating the need to regenerate the image created by the lens object when overlaying lens objects are modified. If operations in lens object 303 are modified, image clip 305 is used as input to modified lens object 303. Therefore, there is no need to regenerate the output of lens objects 301 or 302.

In one embodiment of the invention, all objects contain an image clip as well as descriptions of the operations performed by the object. In another embodiment, a subset of objects contain image clips. The subset may be selected, for example, based on the relative complexity of the operations of objects, estimated regeneration time of objects, sizes of objects, or other factors. In general, system 120 balances the benefits of the reduced regeneration time against the increased usage of memory or of other resources involved in storing image clips. In another embodiment, lens objects contain image clips but independent operations do not.

Some operations affect the entire image 101. In one embodiment, an image clip is stored for the result of such an operation. However, this may substantially increase memory usage when image 101 is large. Therefore, in an alternative embodiment, image clips are not stored for operations that are applied to the entire image 101.

According to one embodiment, an object contains both an image clip and a description of operations. When the image clip becomes invalid due to changes in the operations of the object, or to changes in other objects, the object generates a new image clip. In one embodiment of the present invention, image clips are not stored on hard disk, but are kept in RAM 122 and are discarded at the end of a user session. The advantage of this technique is that it does not unduly enlarge the size of the stored file containing the image and operations. In another embodiment, image clips are stored in data storage 123 so they may be available in future sessions.

When an image clip is available for a particular object, it may be unnecessary to regenerate operations for other objects that lie underneath the particular object. Specifically, if the region of operation of an underlying object lies completely within the region of operation for the object having the image clip, the operations of the underlying object need not be performed, since their output will be replaced by retrieval of the image clip. Thus, in one embodiment of the present invention, system 120 determines whether any underlying objects have regions of operation lying completely within the area defined by an overlaying image clip, and if so, omits performance of the image processing operations of the underlying objects.

Partial Updates

Figures 1, 3B:
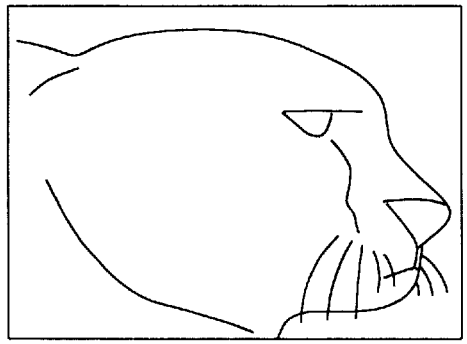
FIGS. 3b.1 through 3b.4 show an image in its original form, then modified by a paint stroke, a twirl effect, and a modified twirl effect.
Figures 2, 3B:
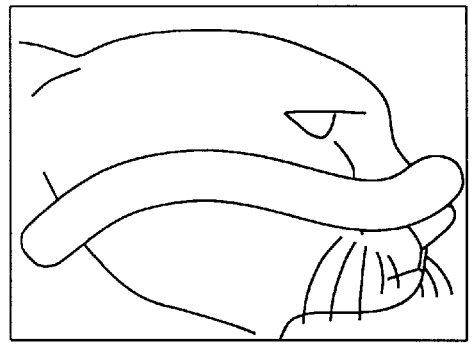
Figures 3, 3B:
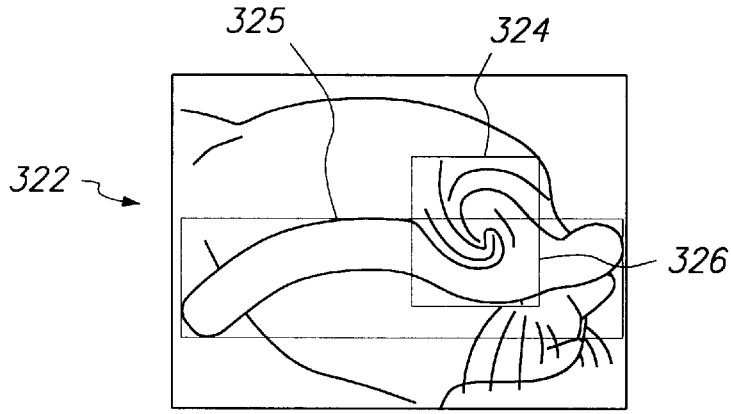
Figures 3, 3B, 4:
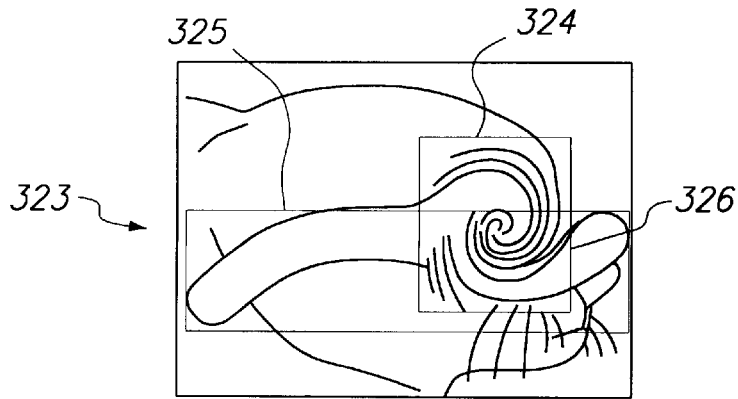

Referring now to FIGS. 3b.1 through 3b.4, it has been found advantageous to selectively regenerate images for partial areas rather than for the entire original area of interest. In general, non-distortion type area operations, as well as paint stroke and image processing brush operations, allow the use of partial updates. FIG. 3b.1 shows an image 320 in its original form. FIG. 3b.2 shows image 321 with a paint stroke drawn as a first operation. FIG. 3b.3 shows image 322 with a twirl effect operation superimposed on the paint stroke. Area 325 indicates that portion of image 322 affected by the paint stroke operation. Area 324 indicates that portion of image 322 affected by the twirl operation. Area 326 represents that portion of image 322 affected by both operations. FIG. 3b.4 shows image 323 after modification of the twirl effect. Rather than regenerating the image for area 325 containing results of the entire paint stroke operation, system 120 saves time by regenerating the image for area 326 representing that portion of the paint stroke which lies under the area affected by the twirl effect operation, without regenerating the remainder of area 325 which is not affected by the twirl effect operation.

Figures 1, 3C:
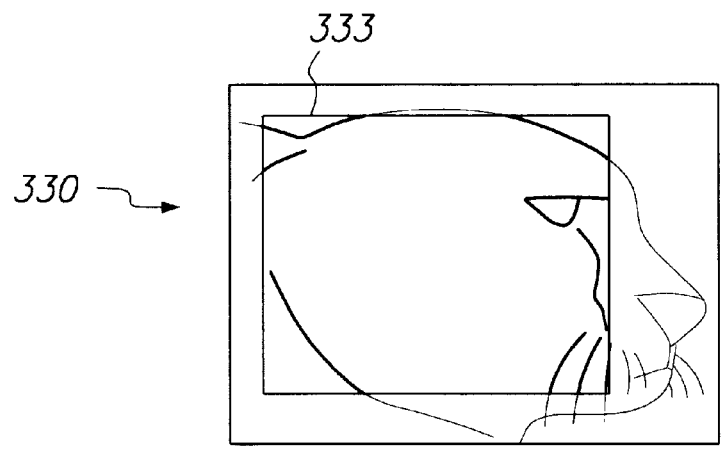
FIGS. 3c.1 through 3c.3 show an image modified by a brighten effect, a twirl effect, and a modified twirl effect.
Figures 2, 3C:
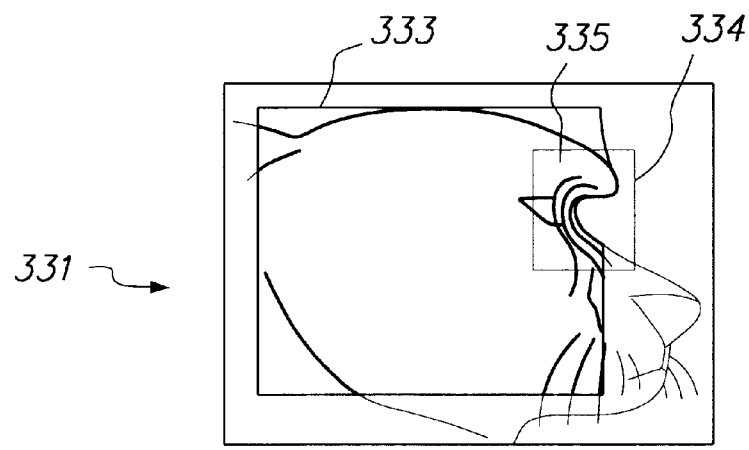
Figures 3, 3C:
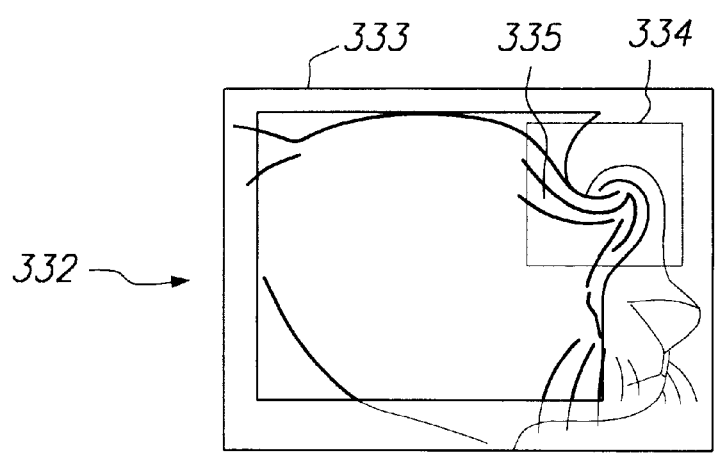

Referring now to FIGS. 3c.1 through 3c.3, there is shown another example of partial updates. FIG. 3c.1 shows an image 330 with a brighten effect operation performed on area 333. FIG. 3c.2 shows image 331 with a twirl effect operation superimposed on the brighten operation. Area 334 indicates that portion of image 331 which is affected by the twirl effect operation. Area 335 indicates that portion of image 331 which is affected by both operations. FIG. 3c.3 shows image 332 after modification of the twirl effect. Rather than regenerating the image for the entire area 333 affected by the brighten operation, system 120 regenerates the image in area 335 which are affected by both the brighten operation and the modified twirl effect operation, without regenerating the remainder of area 333 which is not affected by the twirl effect operation.

Figures 1, 3D:
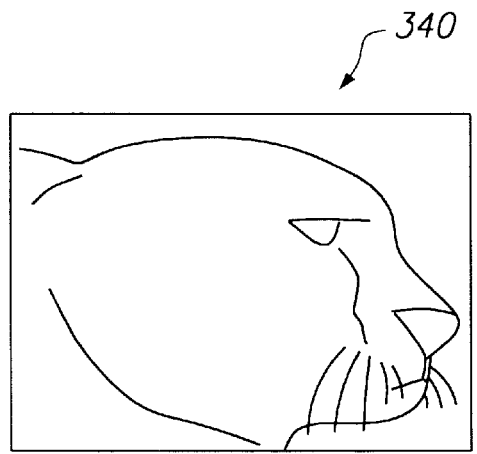
FIGS. 3d.1 through 3d.4 show an image in its original form, then modified by a ripple effect, a threshold effect, and a modified threshold effect.
Figures 2, 3D:
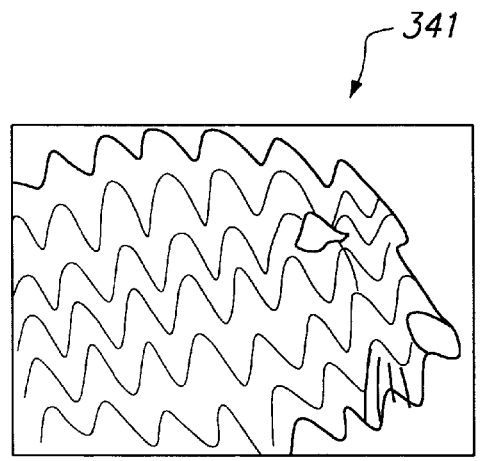
Figures 3, 3D:
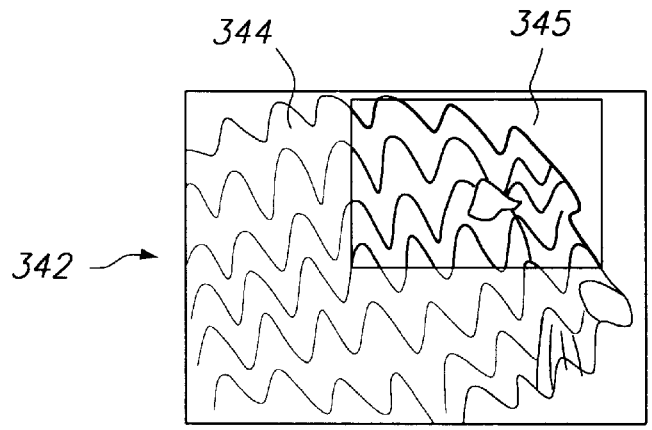
Figures 3, 3D, 4:
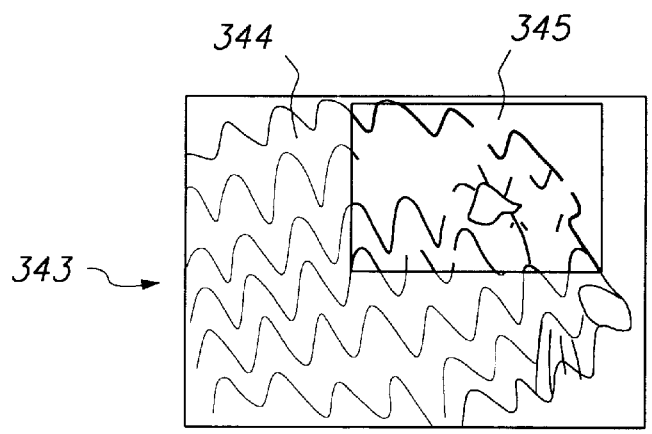

Some image processing operations do not allow for effective use of partial updating. One example is a distortion-type effect, where regeneration of a portion of the affected region requires regeneration of the entire original region. In order to handle exceptions such as this, in one embodiment system 120 stores information associated with each operation specifying whether partial updates are feasible for that operation. When the information indicates that partial updates are not feasible, full regeneration is performed as follows. Referring now to FIGS. 3d.1 through 3d.4, there is shown an example of a situation where partial update is avoided in the preferred embodiment. FIG. 3d.1 shows an image 340 in its original form. FIG. 3d.2 shows image 341 with a ripple effect for the entire image 341 as a first operation. FIG. 3d.3 shows image 342 with a threshold effect operation superimposed on the ripple effect. Area 344 indicates that portion of image 340 affected by the ripple operation, which in this case corresponds to the entire image 342. Area 345 indicates that portion of image 342 which is affected by both operations. FIG. 3d.4 shows image 343 after modification of the threshold effect. Since the ripple effect cannot effectively be regenerated just for area 345 without regenerating the entire affected area 344, system 120 regenerates the ripple effect for the entire area 344.

Temporary Backgrounds

As discussed previously, one of the disadvantages of prior art schemes is the unpredictability of regeneration time. When the user makes a minor change to one of the operations, this minor change may cause a chain reaction requiring regeneration of large portions of the image using complex operations and taking a significant amount of time. As discussed above, partial updates may reduce such regeneration time, but in some embodiments are not always available for all types of operations.

Referring now to FIG. 3e.1, there is shown a configuration of lens objects and independent operations 341–347 operating on background image 101. According to the prior art, and in the absence of partial updates, modification of operation 4 (347) would normally require regeneration of operations 1, 2, and 3 and lens objects 1, 2, and 3 (341–347).

However, referring now to FIG. 3e.2, there is shown the same configuration as in FIG. 3e.1, but with a temporary background 348 that stores an image bitmap representing the state of image 101 processed by lens object 346 and all underlying lens objects and operations 341–345. When temporary background 348 is stored, modification of operation 4 (347) would not require regeneration of objects 341–347. Rather, system 120 merely retrieves the stored temporary background 348 and applies modified operation 4 (347).

In one embodiment of the present invention, temporary background 348 is stored in RAM 122. In an alternative embodiment, it is stored in data storage 123. In either case, storage of temporary background 348 may be resource-expensive when the image is large. Therefore, in one embodiment of the present invention, the user may select when temporary backgrounds 348 will be stored. Generally, the user can estimate when it would be beneficial to store a temporary background 348, since he or she will often know when changes to underlying operations are more or less likely to occur. In the example of FIG. 3e.2, the user would preferably select generation of temporary background 348 when underlying objects 341–346 are less likely to be modified, but subsequent objects 347 may be modified.

Figures 1, 3F:
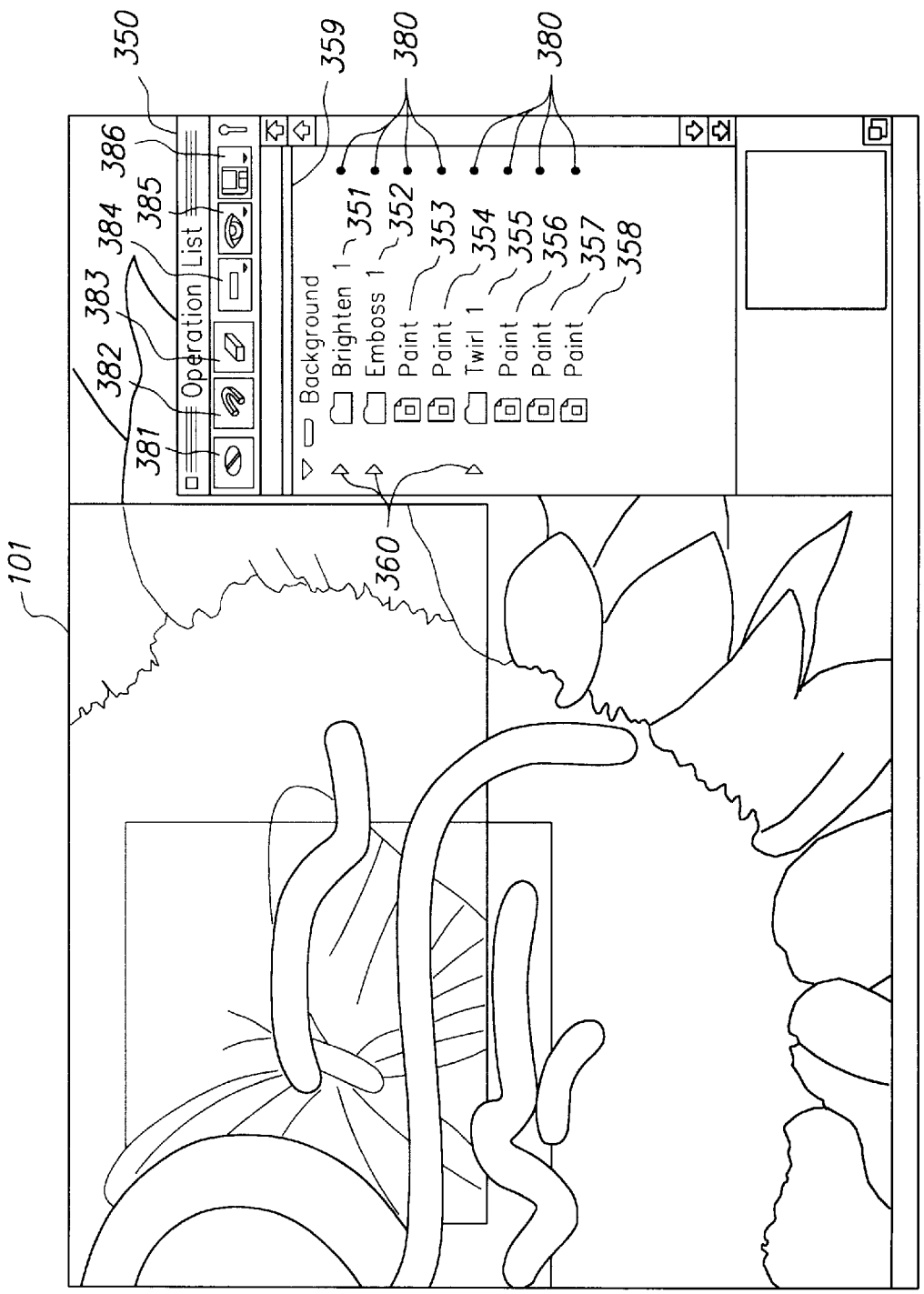
FIG. 3f.1 is a screen shot of a user interface according to the present invention, including an operation list window.
Figures 2, 3F:
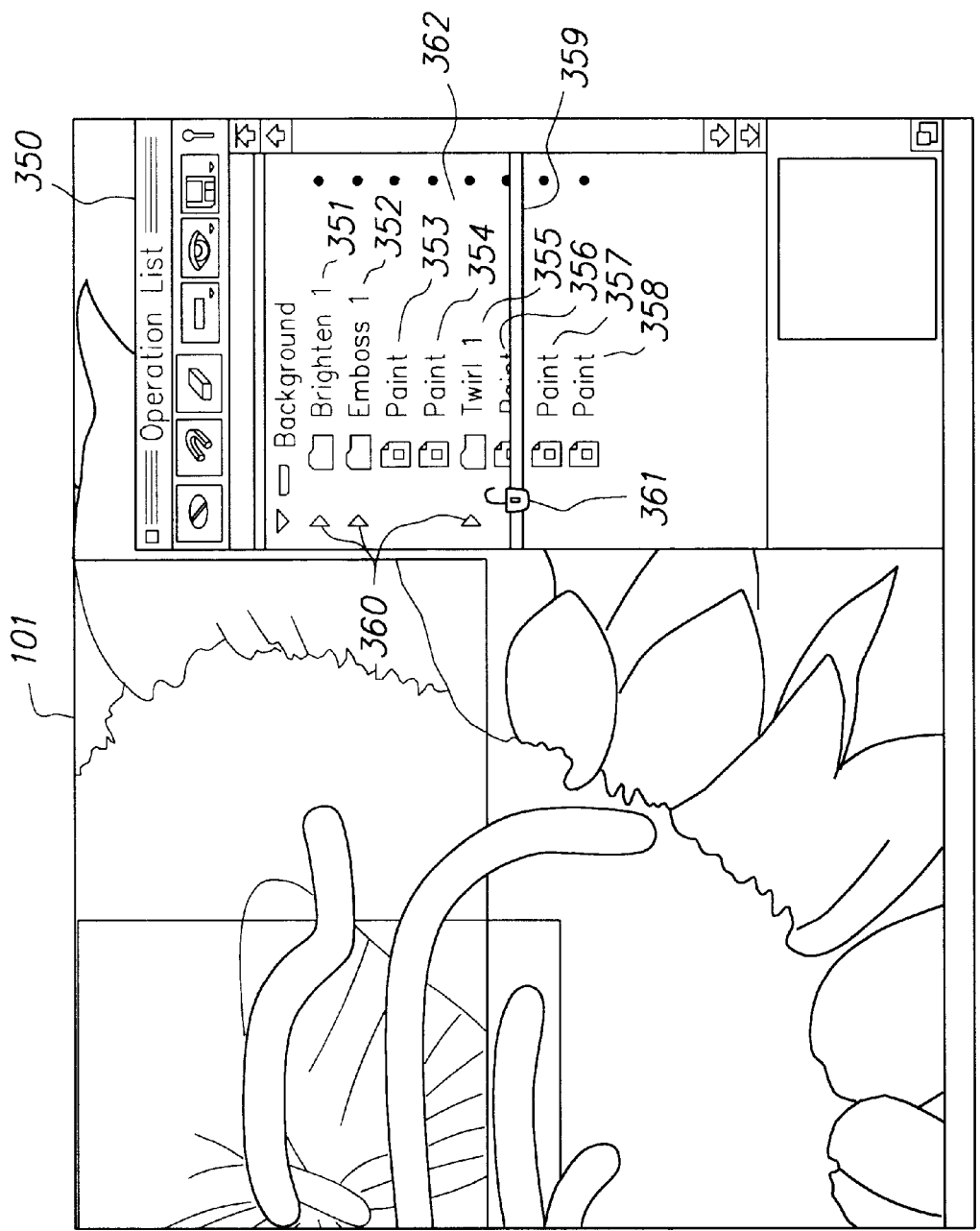

Referring now to FIG. 3f.1, there is shown a sample screen shot of a user interface according to one embodiment of the present invention. Background image 101 is shown as modified by a number of operations. Operation list 350 is shown in a movable, resizable window containing icons 351–358 representing lens objects and independent operations. Icons 351, 352 and 355 represent lens objects and resemble folders which can be "opened" to reveal the operations contained in the lens objects. In addition, lens objects may contain other lens objects in a nested scheme. Icons 353, 354, 356, 357, 358 represent independent operations not contained in lens objects. As stated previously, the term "objects" refers to both lens objects and independent operations. The user can modify operations and lens objects by manipulating the icons. For example, moving the icons changes the order of application of the operations or lens objects; deleting the icons deletes operations or lens objects; and double-clicking the icons permits access to dialog boxes permitting the user to change parameters. All of these actions may be performed using a mouse or keyboard input device to manipulate on-screen objects in a conventional manner. Clicking on one of triangles 360 causes system 120 to display items contained within the lens object adjacent to the triangle 360. Items are then displayed in a hierarchical list view. Shade 359 is a movable horizontal bar which can be used to control storage of temporary backgrounds, as will be further described below in connection with FIG. 3f.2. The user can move shade 359 by positioning an on-screen cursor over shade 359, clicking a mouse button, and "dragging" shade 359 up or down while holding the mouse button.

Dots 380 indicate active objects. The user may make an object inactive by clicking on the dot 380 adjacent to that object. The selected dot 380 then changes to a representation of a pencil with a line through it (not shown) to indicate that the corresponding object is now inactive. When an object is inactive, its operations are not performed. In this way, the user may designate lens objects, independent operations, or individual operations within lens objects as inactive. This may be useful, for example, for testing the operation of an object. or for experimenting with a new object.

Buttons 381–386 provide additional features and options which operate in one embodiment as follows.

Inside/outside toggle button 381 specifies whether the region of operation for a selected object is the area enclosed by the object's perimeter, or the area outside the object's perimeter. The user may toggle between these two options for a selected object by clicking on button 381.

Magnet button 382 brings a selected object into view. If the user has selected one of objects 351–358 by clicking on its associated icon, clicking on button 382 adjusts the viewable portion of image 101 so that the region of operation of the selected object is centered on the screen. If the user has selected one of objects 351–358 by clicking on its region of operation on the screen, clicking on button 382 automatically scrolls operations list 350 as needed to display the icon corresponding to the selected object.

Eraser button 383 deletes a selected object. The user clicks on button 383 after selecting one of objects 351–358. If no object is first selected, system 120 prompts for confirmation, then deletes all objects.

Layer button 384 provides access to a pull-down menu (not shown) containing commands to create, delete, and modify layers. Each layer includes a separate background image 101 and associated objects which operate as described herein. Each layer is shown in operation list 350 as a separate hierarchy of icons. Lens objects and operations may be moved freely across layers by dragging icons. Transformed images are generated separately for each layer and superimposed on one another to produce a final image.

Suspend/resume button 385 provides access to a pull-down menu (not shown) containing a Suspend command, a Resume command, and a Redraw All command. The Suspend command suspends regeneration of images, so that the user can make changes to object attributes without waiting for regeneration to occur after each change. The Resume command resumes automated regeneration of images. This is advantageous when, for example, the user wishes to perform a number of complex modifications without having the image regenerate until after the modifications have all been specified. The Redraw All command causes system 120 to regenerate the transformed image using all objects, including those that have been designated inactive by clicking on dots 380. Thus, the Redraw All command temporarily overrides the inactive state.

Append/extract button 386 provides access to a pull-down menu (not shown) containing an Append command and an Extract command. The Extract command saves a representation of the current set of objects 351–358 in data storage 123. The Append command retrieves a previously-saved set of objects for application to the current image 101. Thus, a commonly-used set of objects representing a series of image processing operations may be saved and later applied to a number of different images.

Referring now to FIG. 3f.2, there is shown a sample screen shot of a user interface according to one embodiment of the present invention, in which the user has moved shade 359 across icons 351–356 by "dragging" with a mouse input device. Shaded area 362 is shown between the top of the operation list window 350 and the current position of shade 359 so that area 362 now covers icons 351–356. Shaded area 362 designates the operations that will be subsumed into a temporary background as described above. This provides a visual cue informing the user that shaded operations are not currently modifiable. If the user wishes to make a change to an operation lying within shaded area 362, the user must first move shade 359 so that shaded area 362 no longer covers the operation to be modified.

In response to the user's movement of shade 359, system 120 generates and stores a temporary background corresponding to the new position of shade 359, by applying all operations from the original background to the new position of shade 359. In one embodiment, if the user moves shade 359 across all of the operation icons so that shaded area 362 covers all the icons, system 120 does not generate a new temporary background but merely stores the current image as the temporary background.

In the example shown, system 120 stores a temporary background representing background image 101 as modified by the operations and lens objects represented by icons 351–356. Thus, if other operations or lens objects are modified, added, or deleted, system 120 does not need to regenerate the image by applying all operations and lens objects, but rather can retrieve the stored temporary background and perform subsequent operations on it. The user can click on lock icon 361 to "lock" the position of shade 359 and prevent accidental movement of shade 359. When icon 361 is in the locked position, shade 359 cannot be moved; when icon 361 is in the unlocked position (as shown in FIG. 3f.2), shade 359 can be moved freely.

Figures 1, 3G:
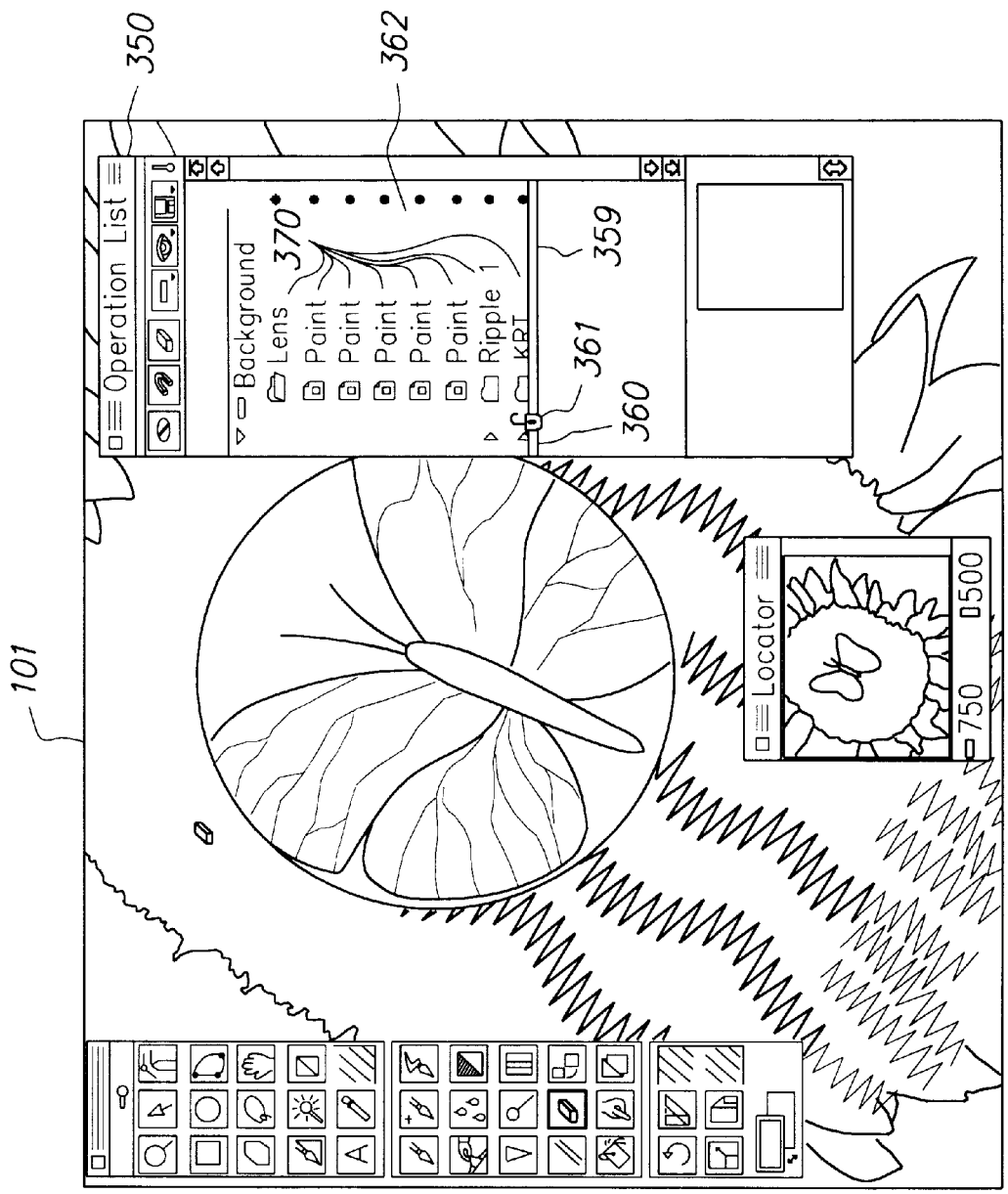
FIGS. 3g.1 and 3g.2 are screen shots showing operation of an erase effect as an exception to the temporary background feature.
Figures 2, 3G:
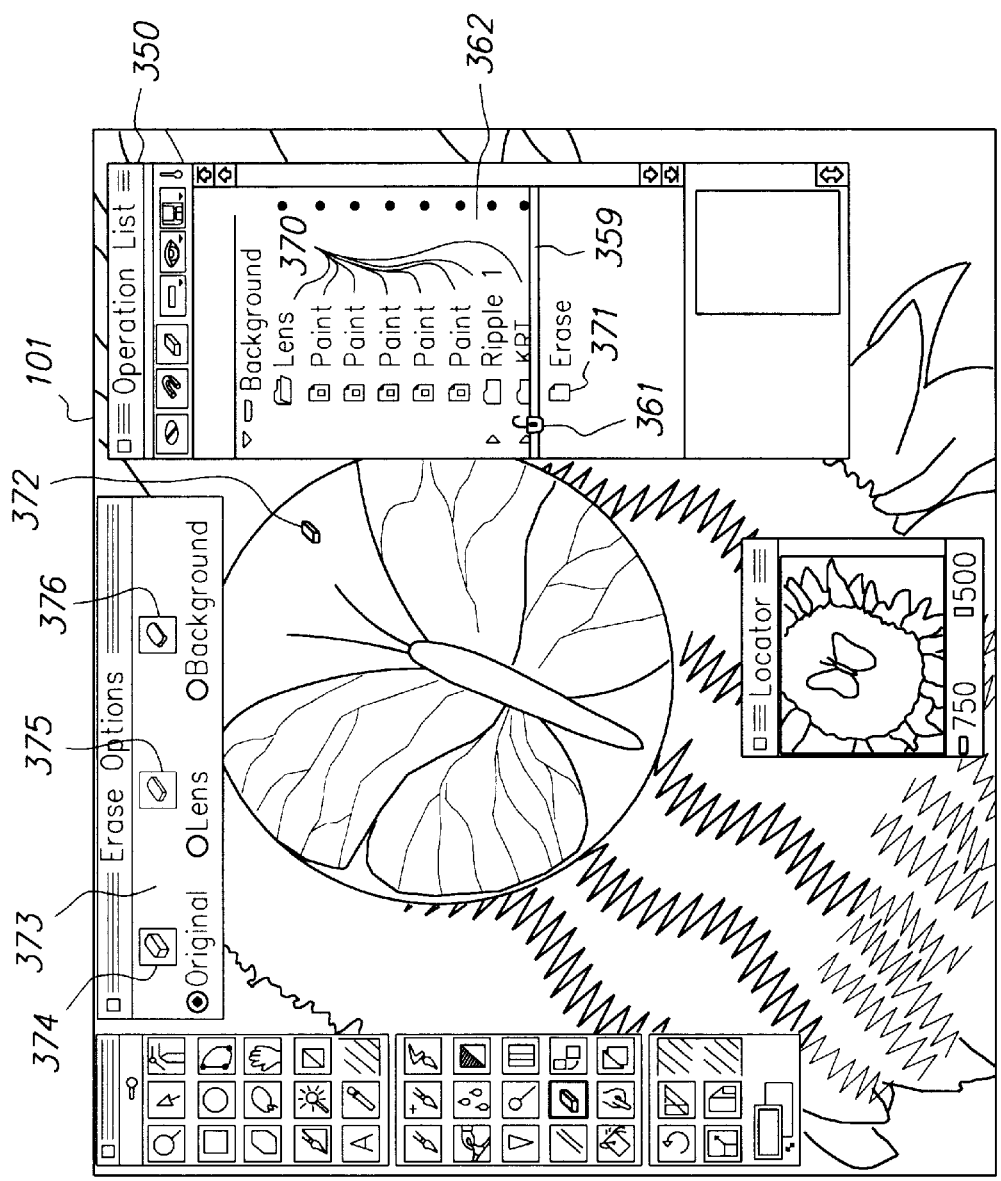

Referring now to FIGS. 3g.1 and 3g.2, there are shown screen shots of an example of an erase effect as applied to background image 101. FIG. 3g.1 shows background image 101 as modified by a series of lens objects and operations represented by icons 370 in operation list 350. Shade 359 has been moved so that shaded area 362 covers all the icons 370. Thus, system 120 stores a temporary background representing the current state of the image, as described previously.

In FIG. 3g.2, an erase effect has been applied to area 372 of the image. The erase effect is represented by icon 371. Normally, when a new operation or lens object is added, it is simply applied to the temporary background as described previously. However, when an erase effect is added, there is ambiguity as to the user's intent. It may be unclear whether the user wishes 1) to erase the effects of all operations and lens objects for a given area, so as to reveal the underlying background image 101 for that area; or 2) to erase the effects associated with a particular lens object or operation for a given area, so as to reveal the image underneath that lens object or operation. When an erase effect is added, the user is presented with an Erase Options dialog box 373 to allow him or her to select which of these options is desired. If the user selects the Original option 374, system 120 retrieves and displays a portion of the original background image 101 corresponding to the selected area, without regard to the temporary background for that area. If the user selects the Lens option 375 after selecting one of the lens objects or operations, system 120 retrieves and displays a portion of the image underlying the specified lens object or operation and corresponding to the selected area, without regard to the temporary background for that area. If the user selects the Background option 376, system 120 retrieves and displays a portion of a predefined background image or color corresponding to the selected area, without regard to the temporary background for that area. In addition, in one embodiment, the user may specify that he or she wishes to erase the effects of operations and lens objects that have been applied on top of the temporary background for a given area, so as to reveal the temporary background for that area.

Figure 4A:
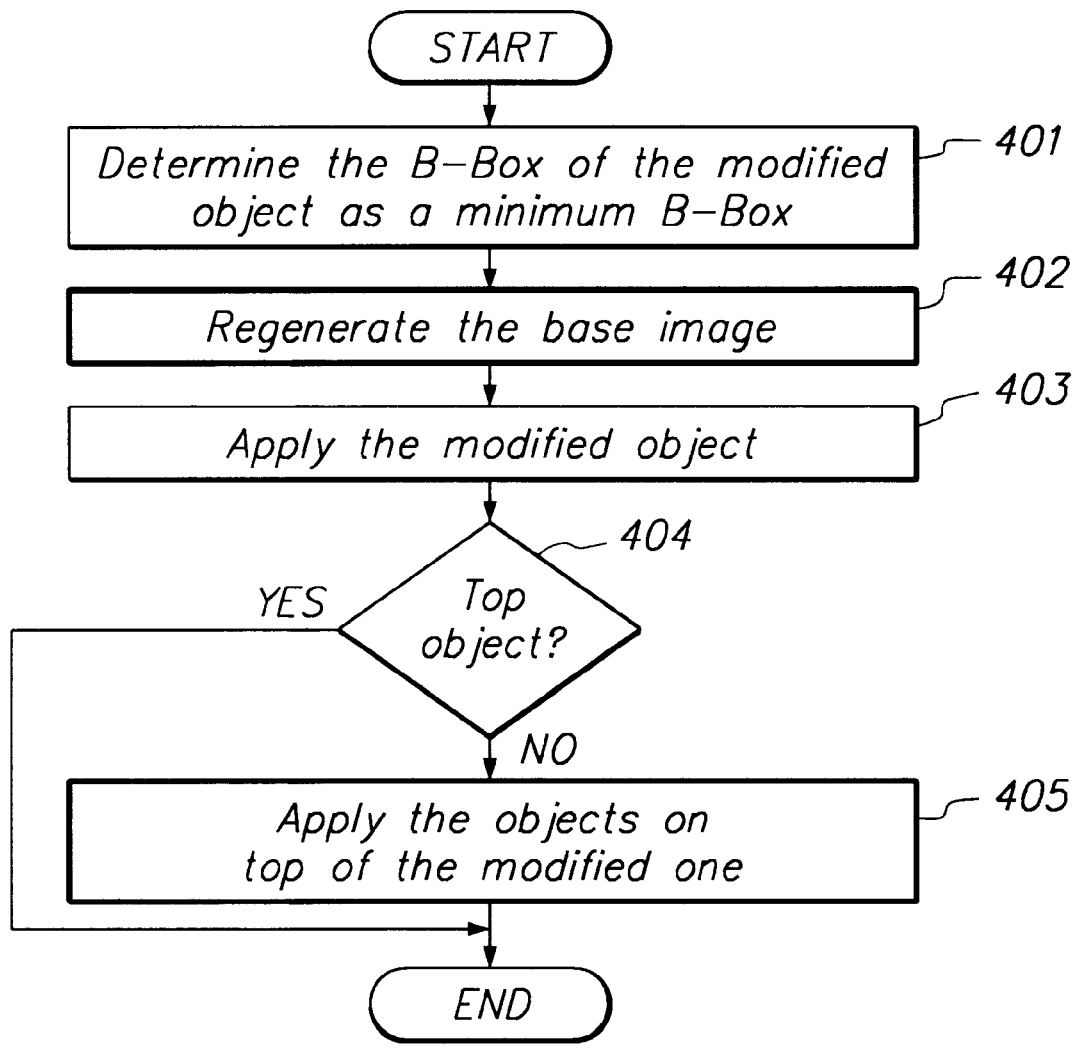
FIG. 4a is a flowchart showing operation of the present invention.

Referring now to FIG. 4a, there is shown a flowchart of the operation of the present invention according to one embodiment. When an object is modified, system 120 defines 401 a minimum bounding box initially including the image region affected by the modified object. System 120 then regenerates 402 the base image which forms the input to the modified object. The operation of 402 will be described in more detail in connection with FIG. 4b. System 120 then applies 403 the modified object to the base image generated in 402. If system 120 determines 404 that the applied object is the top object, the process is completed and the image is displayed. If system 120 determines 404 that the applied object is not the top object, system 120 applies 405 all overlaying objects on top of the modified object, as will be described in more detail in connection with FIG. 4d. Once this is done, the process is completed and the image is displayed.

Figure 4B:
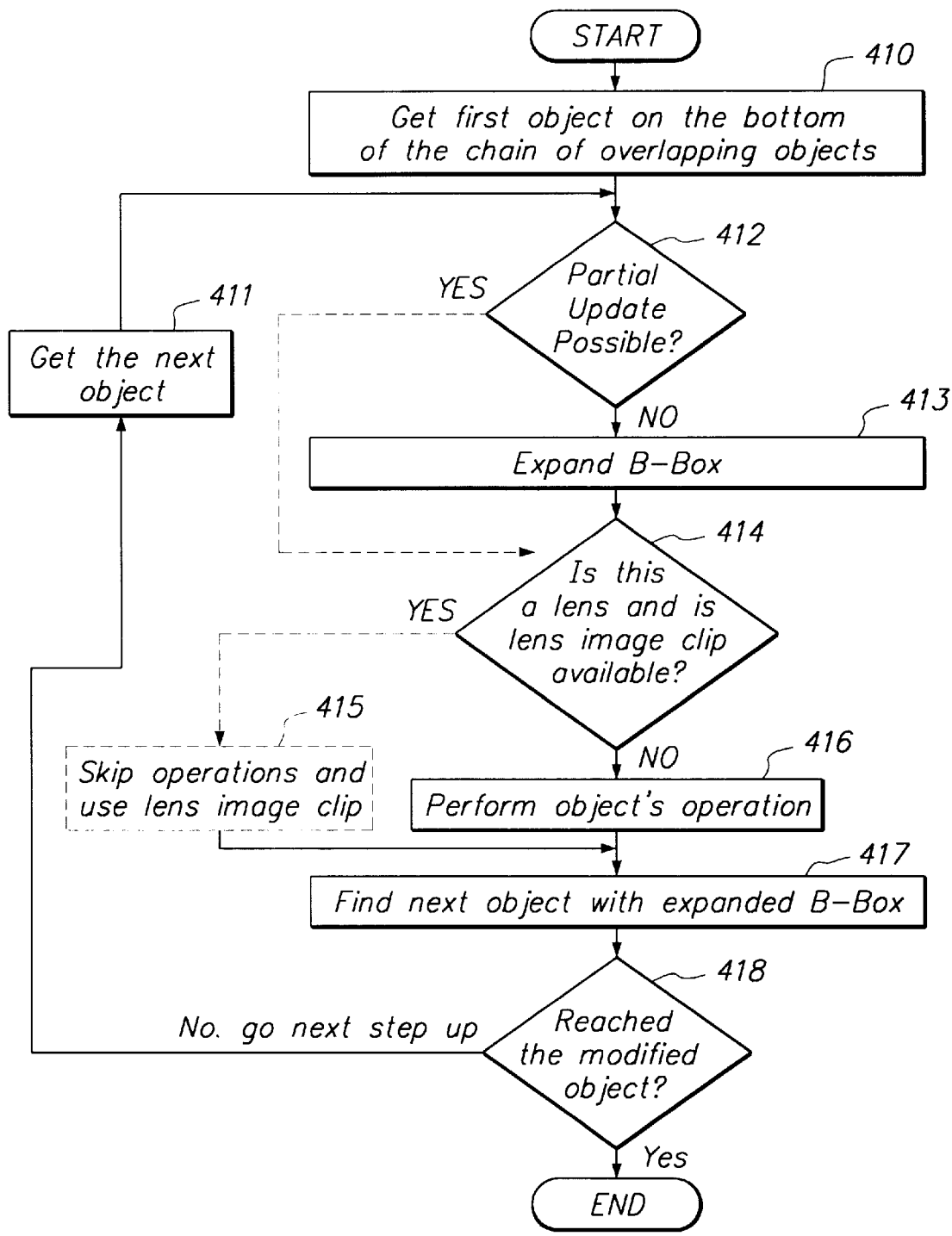
FIG. 4b is a flowchart showing a method of regenerating the base image according to the present invention.

Referring now to FIG. 4b, there is shown a flowchart of a method of regenerating 402 the base image. In this Figure and in FIGS. 4c and 4d, the path denoted by the dotted lines indicates the most efficient, optimal path for processing images. Typically the method of FIG. 4b is executed when there is a chain of overlapping objects representing lens objects or operations. First system 120 gets 410 the first object to be processed. The operation of 410 will be described in more detail in connection with FIG. 4d. System 120 then determines 412 whether a partial update is possible for this object, based on the type of object. If partial update is not possible, system 120 expands 413 the bounding box, if necessary, to include the region affected by this object. Such expansion is generally needed if the object includes some portion of the image not already included in the bounding box previously defined. System 120 then determines 414 whether this object is a lens object and whether an image clip is available for the lens object. In one embodiment, image clips are stored for lens objects only but not for independent operations. In another embodiment, image clips may be stored for lens objects or for independent operations. If system 120 determines that an image clip is available, the image clip is retrieved 415 and the operations of the object do not have to be performed to regenerate the image. If no image clip is available, system 120 performs 416 the operations of the object to regenerate the image portion corresponding to the object. System then selects 417 another object lying within the bounding box, which may have been previously expanded in 413 and which may now include additional objects. System 120 then determines 418 if it has reached the modified object. If so, the base image has been regenerated and the method of regenerating 402 the base image is complete. If not, system 120 gets 411 the next object and repeats 412 through 418.

Figure 4C:
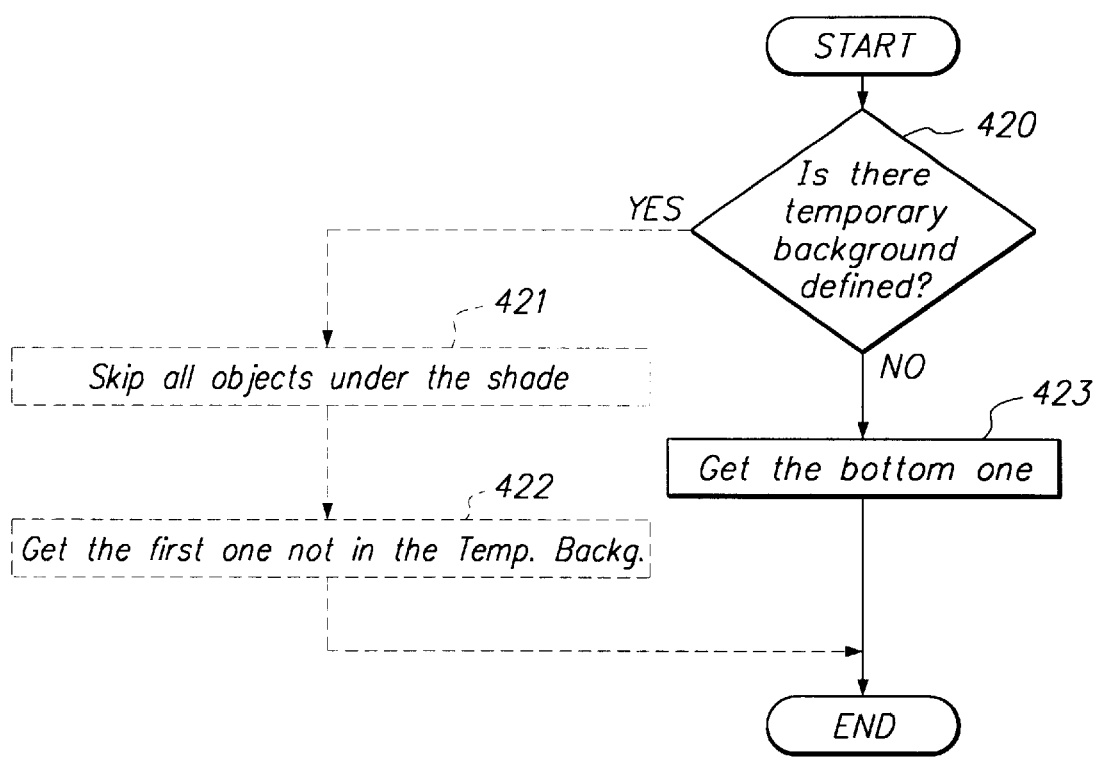
FIG. 4c is a flowchart showing a method of obtaining the first operation according to the present invention.

Referring now to FIG. 4c, there is shown a flowchart of a method of getting 410 the first object overlaying the background image. System 120 determines 420 whether a temporary background has been defined. If so, system 120 skips 421 all objects that have been subsumed under the temporary background and gets 422 the first object that is to be applied onto the temporary background. If no temporary background has been defined, system 120 gets 423 the first object overlaying the background image.

Figure 4D:
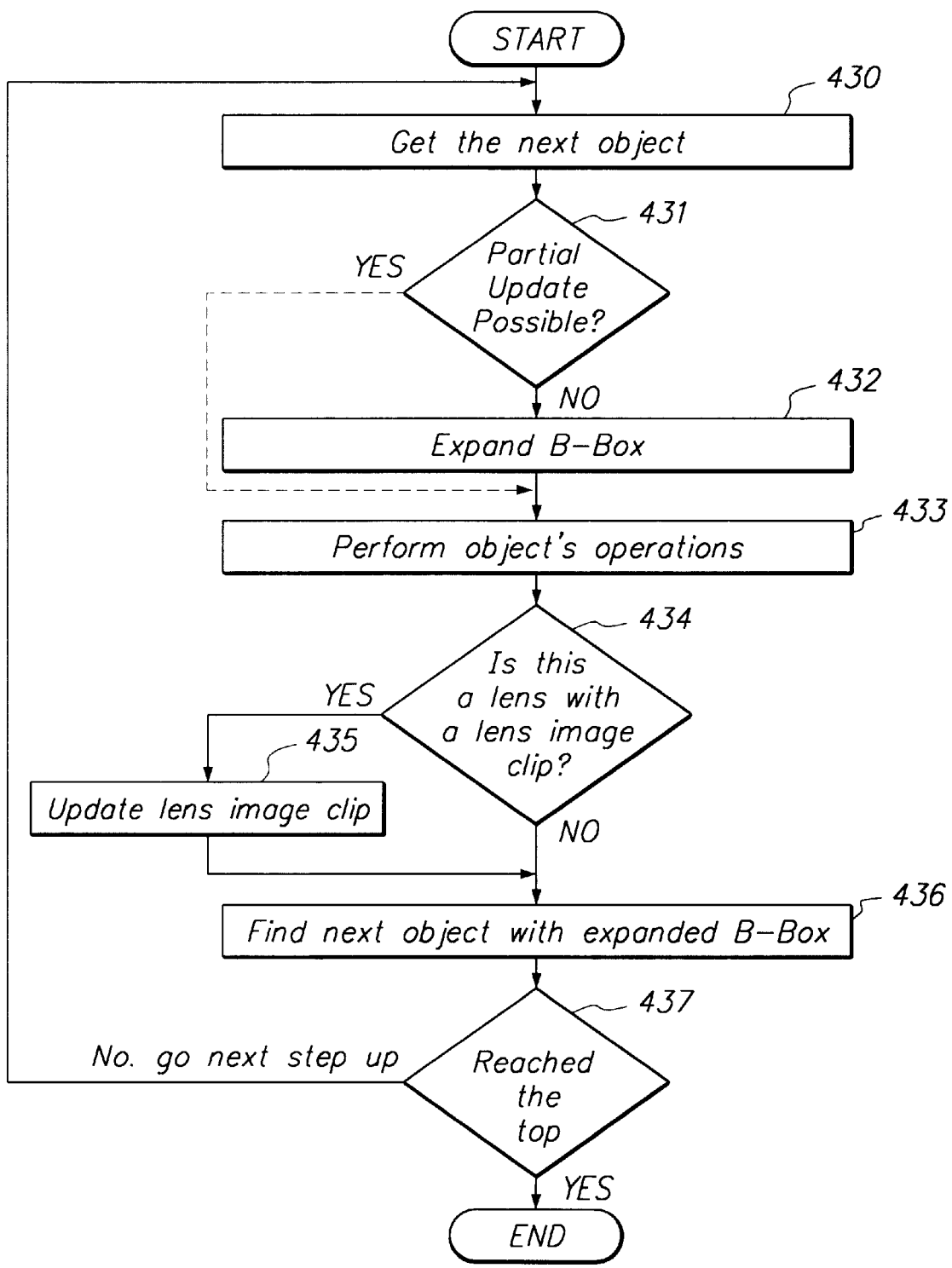
FIG. 4d is a flowchart showing a method of performing all operations over the modified one according to the present invention.

Referring now to FIG. 4d, there is shown a flowchart of a method of applying 405 all overlaying objects on top of the modified object. First system 120 gets 430 the next object to be processed. System 120 then determines 431 whether a partial update is possible for this object, based on the type of object. If partial update is not possible, system 120 expands 432 the bounding box, if necessary, to include the region affected by this object. Such expansion is generally needed if the object includes some portion of the image not already included in the bounding box previously defined. System 120 then performs 433 the operations in the object to regenerate the image portion corresponding to the object. System 120 then determines 434 whether an image clip is stored for the lens object. If so, the image clip is updated 435 based on the newly-applied operations in the object. System 120 then finds the next object within the expanded bounding box. System 120 then determines 437 if it has reached the top object. If so, the image has been regenerated and the method of applying 405 operations in all overlaying objects is complete. If not, system 120 repeats 430 through 437.

Figures 1, 4E:
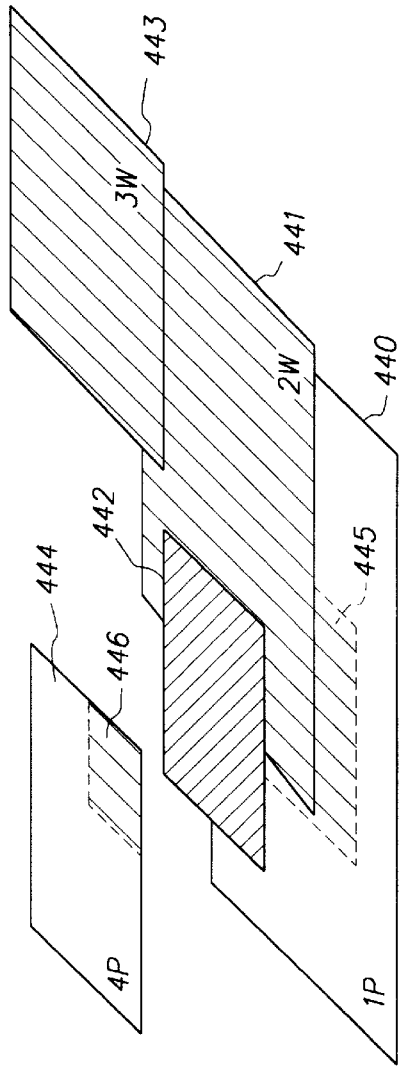
FIG. 4e.1 and 4e.2 are conceptual diagrams showing dynamic expansion of a bounding box according to the present invention.
Figures 2, 4E:
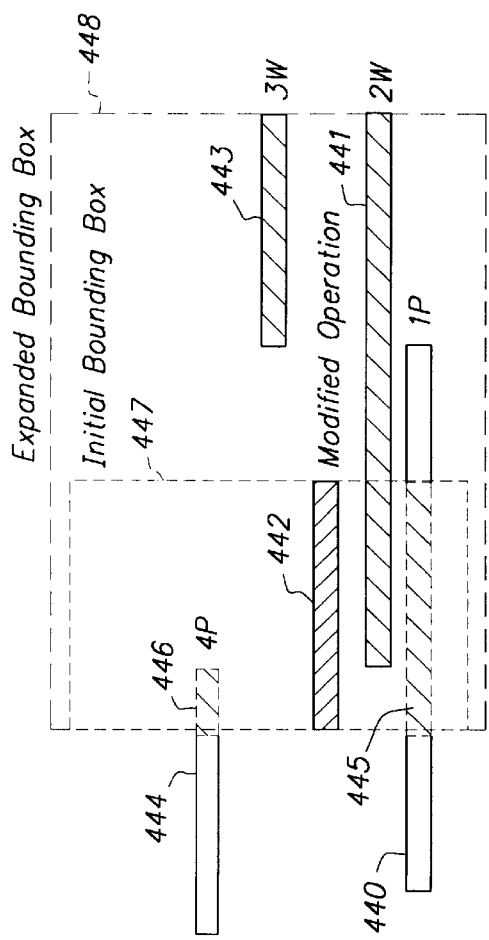

Referring now to FIGS. 4e.1 and 4e.2, there are shown conceptual diagrams illustrating an example of dynamic expansion of a bounding box according to one embodiment of the present invention. FIG. 4e.1 shows a perspective view of a series of overlapping objects, while FIG. 4e.2 shows a side view of the same series of objects. As described above in connection with FIGS. 4b and 4d, the bounding box expands when the region affected by an object includes some portion of the image not already included in the bounding box, and the object is not conducive to partial update.

In the example shown, objects 440 and 444 allow partial updates, and objects 441 and 443 do not allow partial updates. The initial bounding box 447 determined as the area affected by modified object 442, as described previously in 401. Objects 440 and 444 allow partial updates, and therefore do not cause the bounding box to be expanded. Rather, only portion 445 of object 440 and portion 446 of object 444 are regenerated. Since objects 441 and 443 do not allow partial updates, expanded bounding box 448 is determined to include the area affected by objects 441 and 443 as described previously in 413 and 432. Thus, the image portion included in expanded bounding box 448 is regenerated by system 120.

From the above description, it will be apparent that the invention disclosed herein provides a novel and advantageous improved object-based image processing system and method. The foregoing discussion discloses and describes merely exemplary methods and embodiments of the present invention.

What is claimed is:

1. In a computer system including a processor, a memory, and a display, a computer-implemented image processing system for transforming a background image into a transformed image with at least one image processing operation, comprising:

a background image input device for inputting a background image;

an editing device for creating in the memory and manipulating on the display at least one software object representing one of a lens and an image processing operation, each object having a plurality of attributes including a defined region corresponding to a portion of the background image, each lens object having as an attribute at least one image processing operation, each object for applying at least one image processing operation to the portion of the background image corresponding to the defined region of the object, to produce a transformed image;

a database, coupled to the editing device, for storing:

a representation of the background image; and a representation of each object and its attributes for selective subsequent retrieval and modification of an object in response to user specification;

an image clip storage device for at least one object, coupled to the lens editing device, for storing an image clip comprising a bitmap representation of an image resulting from application of the object for selective subsequent retrieval;

a user input device, coupled to the database and to the editing device, for accepting user specification of a selected number of objects in the database, for accepting user specification of the attributes of the objects, and for accepting user specification of modifications to stored attributes, wherein the specified or modified attributes and objects are stored in the database; and an output device, coupled to the editing device and the database, for outputting the transformed image;

wherein the modifications specified by the user are applied by selectively retrieving the stored image clip and performing the at least one image processing operation on the retrieved image clip.

2. The computer-implemented system of claim 1, wherein:

the background image comprises a first bitmap including pixel data;

the transformed image comprises a second bitmap including pixel data; and each image clip comprises a bitmap including pixel data.

3. The computer-implemented system of claim 1, wherein the user input device further accepts user specification for each object specifying whether a corresponding image clip is stored in the image clip storage device.

4. The computer-implemented system of claim 1, wherein the image clip storage device comprises a random-access memory.

5. The computer-implemented system of claim 1, wherein the image clip storage device comprises a portion of the database.

6. The computer-implemented system of claim 1, wherein the editing device creates in the memory and manipulates on the display at least a first object and a second object, wherein the defined regions of the lens objects overlap, and wherein an image processing operation of the second object is applied to at least a portion of a stored image clip associated with the first object.

7. In a computer system including a processor, a memory, and a display, a computer-implemented image processing system for transforming a background image into a transformed image with at least one image processing operation, comprising:

a background image input device for inputting a background image;

an editing device for creating in the memory and manipulating on the display at least one software object representing one of a lens and an image processing operation, each object having a plurality of attributes including a defined region corresponding to a portion of the background image, each lens object having as an attribute at least one image processing operation, each object for applying at least one image processing operation to the portion of the background image corresponding to the defined region of the object, to produce a transformed image;

a database, coupled to the editing device, for storing:

a representation of the background image; and a representation of each object and its attributes for selective subsequent retrieval and modification of an object in response to user specification;

an image clip storage device for at least one object, coupled to the lens editing device, for storing an image clip comprising a representation of an image resulting from application of the object for selective subsequent retrieval;

a user input device, coupled to the database and to the editing device, for accepting user specification of a selected number of objects in the database, for accepting user specification of the attributes of the objects, and for accepting user specification of modifications to stored attributes, wherein the specified or modified attributes and objects are stored in the database; and an output device, coupled to the editing device and the database, for outputting the transformed image;

wherein the image clip storage device selectively stores an image clip for at least one object responsive to at least one of relative complexity of the object, estimated regeneration time of image processing operations described in the object, and size of defined region of the object.

8. The computer-implemented system of claim 1, wherein at least one of the objects selectively performs an image processing operation for a portion of the defined region of the object not including the entire defined region of the object.

9. In a computer system including a processor, a memory, and a display, a computer-implemented image processing system for transforming a background image into a transformed image with at least one image processing operation, comprising:

a background image input device for inputting a background image;

an editing device for creating in the memory and manipulating on the display at least one software object representing one of a lens and an image processing operation, each object having a plurality of attributes including a defined region corresponding to a portion of the background image, each lens object having as an attribute at least one image processing operation, each of at least one object for applying at least one image processing operation to the portion of the background image corresponding to the defined region of the object, to produce a transformed image;

a database, coupled to the editing device, for storing:
 a representation of the background image; and
 a representation of each object and its attributes for selective subsequent retrieval and modification of an object in response to user specification;

a temporary background image storage device, coupled to the editing device, for storing a bitmap representation of a temporary background image formed by application of a specified subset of the objects to the background image;

a user input device, coupled to the database and the editing device, for accepting user specification of a selected number of objects in the database, for accepting user specification of the attributes of the objects, and for accepting user specification of modifications to stored attributes, wherein the specified or modified attributes and objects are stored in the database; and an output device, coupled to the editing device and the database, for outputting the transformed image.

10. The computer-implemented system of claim 9, wherein:
 the background image comprises a first bitmap including pixel data;
 the transformed image comprises a second bitmap including pixel data; and
 the temporary background image comprises a bitmap including pixel data.

11. The computer-implemented system of claim 9, wherein at least one object applies at least one image processing operation to the portion of the stored temporary background image corresponding to the defined region of the object to produce the transformed image.

12. The computer-implemented system of claim 9, wherein the user input device accepts user specification of the specified subset of objects.

13. A computer-implemented image processing method, comprising:

(a) accepting input describing a background image;

(b) defining at least one software object representing one of a lens and an image processing operation, each object having a plurality of attributes including a defined region corresponding to a portion of the background image, each lens object having as an attribute at least one image processing operation;

(c) storing the attributes of each object in a database;

(d) storing, for at least one object, an image clip comprising a bitmap representing a transformed portion of the background image corresponding to the defined region for the object;

(e) selectively retrieving from the database and modifying the attributes of an object in response to user specification;

(f) retrieving from the database the attributes of a selected object;

(g) transforming the portions of the image clip and the background image corresponding to the defined regions of the selected object by applying at least one image processing operation included in the retrieved attributes of each selected object to the portion of the background image corresponding to the defined region of the selected object and to the portion of the image clip lying within the defined region of the selected object, to produce a transformed image; and (h) outputting the transformed image.

14. The computer-implemented method of claim 13, wherein (d) comprises storing the image clip in a random-access memory.

15. The computer-implemented method of claim 13, wherein (d) comprises storing the image clip in the database.

16. A computer-implemented image processing method, comprising:

(a) accepting input describing a background image;

(b) defining at least one software object representing one of a lens and an image processing operation, each object having a plurality of attributes including a defined region corresponding to a portion of the background image, each lens object having as an attribute at least one image processing operation;

(c) transforming a portion of the background image corresponding to the defined region of a first object by applying at least one image processing operation included in the attributes of the first object to the portion of the background image corresponding to the defined region of the first object, to produce an intermediate image;

(d) transforming, subsequent to (c), a portion of the intermediate image corresponding to the defined region of an intermediate object by applying at least one image processing operation included in the attributes of the intermediate object to the portion of the intermediate image corresponding to the defined region of the intermediate object;

(e) selectively repeating (d) for any number of intermediate objects, each transformation by an intermediate object being subsequent to the transformation of a prior intermediate object;

(f) accepting input modifying at least one attribute of an object;

(g) performing a partial update to the transformed image; and (h) outputting the updated transformed image;

wherein (g) comprises:

(g.1) defining a bounding box as the defined region of the modified object;

(g.2) regenerating an intermediate image for input to the modified object by:

(g.2.1) determining whether a temporary background image has been defined;

(g.2.2) responsive to a temporary background image having been defined, designating the temporary background image as a base image and designating a first object not included in the temporary background image as the selected object;

(g.2.3) responsive to a temporary background image not having been defined, designating the background image as a base image and designating a first object as the selected object;

(g.2.4) determining whether a partial update is preferred for the selected object;

(g.2.5) responsive to a partial update not being preferred, expanding the bounding box to include the defined region of the selected object;

(g.2.6) determining whether an image clip is available for the selected object;

(g.2.7) responsive to an image clip being available, retrieving the image clip;

(g.2.8) responsive to an image clip not being available, transforming a portion of the base image corresponding to the defined region of the selected object by applying at least one image processing operation included in the attributes of the selected object to the portion of the base image corresponding to the defined region of the selected object to create a new base image;

(g.2.9) determining whether any other objects having a region of operation intersecting with the bounding box have not been selected; and (g.2.10) responsive to any other objects having a region of operation intersecting with the bounding box having not been selected, designating one of the objects as the selected object and repeating (g.2.4) through (g.2.10); and (g.3) transforming a portion of the regenerated intermediate image corresponding to the defined region of the modified object by applying at least one image processing operation included in the attributes of the modified object to the portion of the regenerated intermediate image corresponding to the defined region of the modified object; and (g.4) subsequent to (g.3), transforming the regenerated intermediate image by applying any number of subsequent objects to the regenerated intermediate image.

17. A computer-implemented image processing method comprising:

(a) accepting input describing a background image;

(b) defining at least one software object representing one of a lens and an image processing operation, each object having a plurality of attributes including a defined region corresponding to a portion of the background image, each lens object having as an attribute at least one image processing operation;

(c) transforming a portion of the background image corresponding to the defined region of a first object by applying at least one image processing operation included in the attributes of the first object to the portion of the background image corresponding to the defined region of the first object, to produce an intermediate image;

(d) transforming, subsequent to (c), a portion of the intermediate image corresponding to the defined region of an intermediate object by applying at least one image processing operation included in the attributes of the intermediate object to the portion of the intermediate image corresponding to the defined region of the intermediate object;

(e) selectively repeating (d) for any number of intermediate objects, each transformation by an intermediate object being subsequent to the transformation of a prior intermediate object;

(f) accepting input modifying at least one attribute of an object;

(g) performing a partial update to the transformed image; and (h) outputting the updated transformed image;

wherein (g) comprises:

(g.1) defining a bounding box as the defined region of the modified object;

(g.2) regenerating an intermediate image for input to the modified object;

(g.3) transforming a portion of the regenerated intermediate image corresponding to the defined region of the modified object by applying at least one image processing operation included in the attributes of the modified object to the portion of the regenerated intermediate image corresponding to the defined region of the modified object; and (g.4) subsequent to (g.3), transforming the regenerated intermediate image by applying any number of subsequent objects to the regenerated intermediate image by:

(g.4.1) designating a first subsequent object as the selected object;

(g.4.2) determining whether a partial update is preferred for the selected object;

(g.4.3) responsive to a partial update not being preferred, expanding the bounding box to include the defined region of the selected object;

(g.4.4) transforming a portion of the regenerated intermediate image corresponding to the defined region of the selected object by applying at least one image processing operation included in the attributes of the selected object to the portion of the regenerated intermediate image corresponding to the defined region of the selected object to create a new regenerated intermediate image;

(g.4.5) determining whether an image clip is available for the selected object;

(g.4.6) responsive to an image clip being available, updating the image clip according to the results of (g.4.4);

(g.4.7) determining whether any other subsequent objects having a region of operation intersecting with the bounding box have not been selected; and (g.4.8) responsive to any other subsequent objects having a region of operation intersecting with the bounding box having not been selected, designating one of the subsequent objects as the selected object and repeating (g.4.2) through (g.4.8).

18. A computer-implemented image processing method, comprising:

(a) accepting input describing a background image;

(b) defining at least one software object representing one of a lens and an image processing operation, each object having a plurality of attributes including a defined region corresponding to a portion of the background image, each lens object having as an attribute at least one image processing operation;

(c) specifying a subset of the objects;

(d) transforming a portion of the background image corresponding to the defined region of a first object in the specified subset by applying at least one image processing operation included in the attributes of the first object to the portion of the background image corresponding to the defined region of the first object, to produce an intermediate image;

(e) transforming, subsequent to the transformation by the first object, a portion of the intermediate image corresponding to the defined region of an intermediate object in the specified subset by applying at least one image processing operation included in the attributes of the intermediate object to the portion of the intermediate image corresponding to the defined region of the intermediate object;

(f) selectively repeating (e) for any number of intermediate objects in the specified subset, each transformation by an intermediate object being subsequent to the transformation of a prior intermediate object; and (g) storing the transformed image as a bitmap representation of a temporary background image.

19. The computer-implemented method of claim 18, wherein (c) comprises accepting user input specifying a subset of the objects for generating a temporary background.

20. The computer-implemented method of claim 19, wherein (c) comprises accepting user input provided by dragging an on-screen shade over the specified subset of objects.

21. The computer-implemented method of claim 18, further comprising:

(h) transforming a portion of the temporary background image corresponding to the defined region of a second object not in the specified subset by applying at least one image processing operation included in the attributes of the second object to the portion of the temporary background image corresponding to the defined region of the second object, to produce a second transformed image.

22. The computer-implemented method of claim 18, wherein (g) comprises storing the temporary background image in a random-access memory.

23. The computer-implemented method of claim 18, wherein (g) comprises storing the temporary background image in a database.

* * * * *